(12) United States Patent
Yeh

(10) Patent No.: US 8,550,064 B2
(45) Date of Patent: Oct. 8, 2013

(54) BARBECUE STOVE WITH COLLAPSIBLE STAND

(76) Inventor: Jui-Ju Yeh, Taipei (TW)

(*) Notice: Subject to any disclaimer, the term of this patent is extended or adjusted under 35 U.S.C. 154(b) by 414 days.

(21) Appl. No.: 12/987,096

(22) Filed: Jan. 8, 2011

(65) Prior Publication Data
US 2012/0174907 A1    Jul. 12, 2012

(51) Int. Cl.
F24B 3/00    (2006.01)

(52) U.S. Cl.
USPC .............. 126/30; 126/25 R; 126/29; 126/9 R; 126/9 B

(58) Field of Classification Search
USPC ............ 126/25 R, 29, 30, 9 B, 9 R; 108/118, 108/131
See application file for complete search history.

(56) References Cited

U.S. PATENT DOCUMENTS

| | | | | |
|---|---|---|---|---|
| 4,825,781 A * | 5/1989 | Palmer | .......................... | 108/115 |
| 5,163,414 A * | 11/1992 | Haynes, Jr. | ................. | 126/25 R |
| 5,335,604 A * | 8/1994 | Jiang | .............................. | 100/119 |
| 6,439,221 B1 * | 8/2002 | Ward et al. | ................... | 126/25 R |
| 6,863,063 B2 * | 3/2005 | Yeh | ............................... | 126/25 R |
| 7,681,567 B2 * | 3/2010 | Chung | .......................... | 126/25 R |
| 2004/0182381 A1 * | 9/2004 | Yeh | ............................... | 126/25 R |
| 2005/0252504 A1 * | 11/2005 | Cabrera et al. | .................. | 126/50 |
| 2006/0130825 A1 * | 6/2006 | Yeh | ............................... | 126/25 R |
| 2007/0290486 A1 * | 12/2007 | Chung | .......................... | 280/645 |

FOREIGN PATENT DOCUMENTS

DE    29621951 U1 *    2/1997

* cited by examiner

*Primary Examiner* — Kenneth Rinehart
*Assistant Examiner* — Jorge Pereiro
(74) *Attorney, Agent, or Firm* — Rahman LLC

(57) ABSTRACT

A barbecue stove with collapsible stand has a grill pan and a stand mounted on the grill pan. The stand has a main leg mounted pivotally on the grill pan and a secondary leg connected pivotally to the main leg. When the main and secondary legs cross each other, the stand is unfolded and supports the grill pan high above a plane. When the main and secondary legs overlap each other and the main leg is pivoted to lie on the grill pan, the stand is folded into a compact size. The stand of the barbecue stove is structurally simplified and therefore is easy to assemble, fold or unfold.

6 Claims, 5 Drawing Sheets

BARBECUE STOVE WITH COLLAPSIBLE STAND

BACKGROUND OF THE INVENTION

1. Field of the Invention

The present invention relates to a barbecue stove, especially to a barbecue stove with a collapsible stand for the convenience of use, storage and transportation of the barbecue stove.

2. Description of the Prior Art(s)

Barbecuing is a popular and common outdoor recreation. A conventional portable barbecue stove has a grill pan and a collapsible stand mounted on a bottom of the grill pan. When the stand is unfolded, the stand supports the grill pan high above a plane so a user cooks food in the grill pan with a comfortable pose. When barbecuing is finished, the stand is supposed to be folded into a compact size for ease of storage and transportation.

However, since the stand of the conventional barbecue stove is typically bulky and is not easily foldable, it is inconvenient for either assembling, folding or unfolding the conventional barbecue stove. Moreover, the conventional barbecue stove usually has to be carried by the user in order to get transported, which is also inconvenient.

To overcome the shortcomings, the present invention provides a barbecue stove with a collapsible stand to mitigate or obviate the aforementioned problems.

SUMMARY OF THE INVENTION

The main objective of the present invention is to provide a barbecue stove with a collapsible stand.

The barbecue stove has a grill pan and a stand mounted on the grill pan. The stand has a main leg mounted pivotally on the grill pan and a secondary leg connected pivotally to the main leg.

When the main and secondary legs cross each other, the stand is unfolded and supports the grill pan high above a plane. When the main and secondary legs overlap each other and the main leg is pivoted to lie on the grill pan, the stand is folded into a compact size. The stand of the barbecue stove is structurally simplified and therefore is easy to assemble, fold or unfold.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
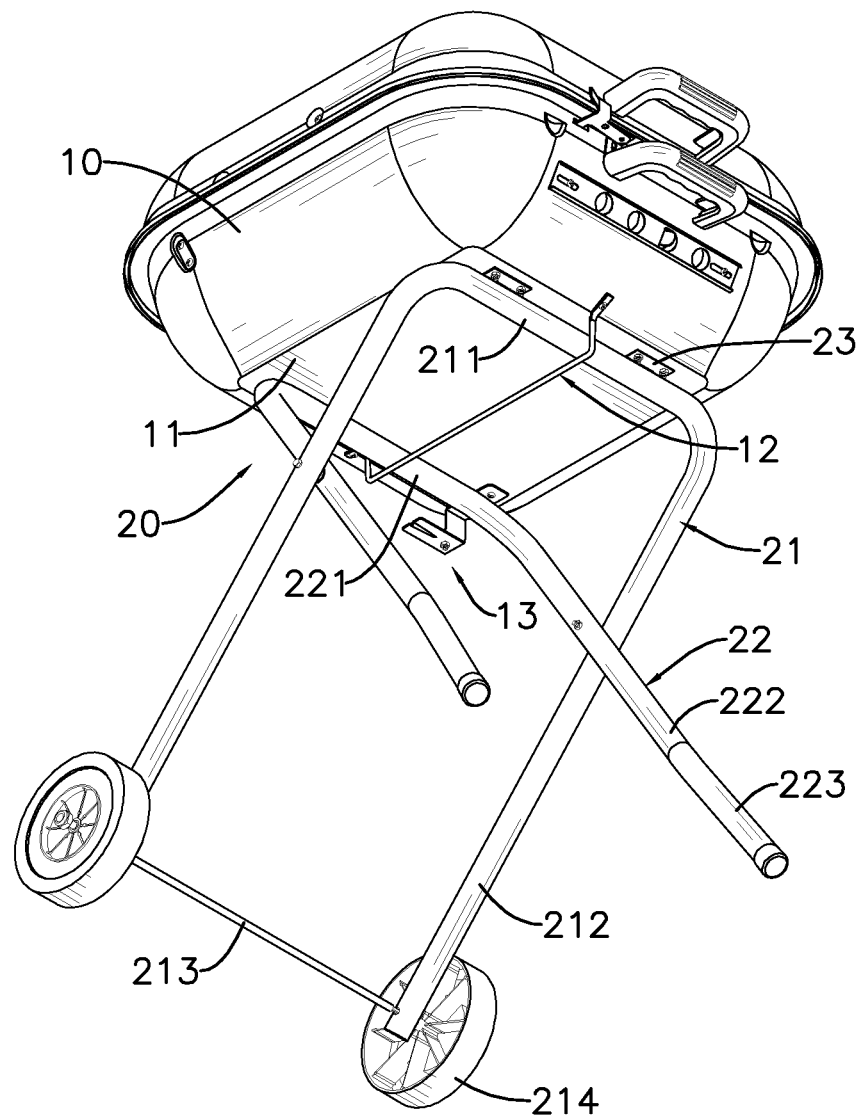
FIG. 1 is a perspective view of a barbecue stove with a collapsible stand in accordance with the present invention.

With reference to FIG. 1, a barbecue stove with a collapsible stand in accordance with the present invention comprises a grill pan 10 and a stand 20.

Figure 2:
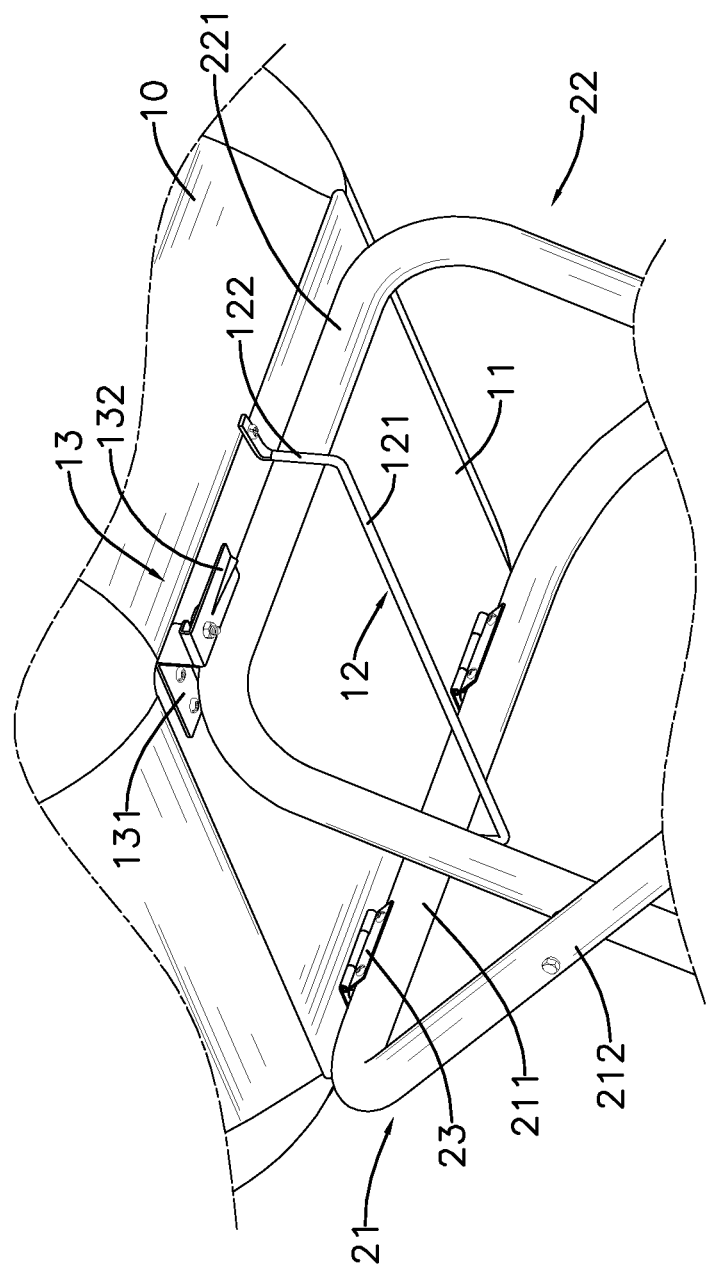
FIG. 2 is an enlarged perspective view of the barbecue stove in FIG. 1.

With further reference to FIG. 2, the grill pan 10 has a bottom 11, a guiding frame 12, a gap and a retainer 13.

The guiding frame 12 is mounted securely on the bottom 11 of the grill pan 10, is U-shaped and has a crossbar 121 and two mounting bars 122. The crossbar 121 of the guiding frame 12 is separated from the bottom 11 of the grill pan 10. The mounting bars 122 protrude substantially perpendicular from the crossbar 121 of the guiding frame 12 and are attached securely to the bottom 11 of the grill pan 10.

The gap is formed between the bottom 11 of the grill pan 10 and the crossbar 121 of the guiding frame 12.

Figure 3:
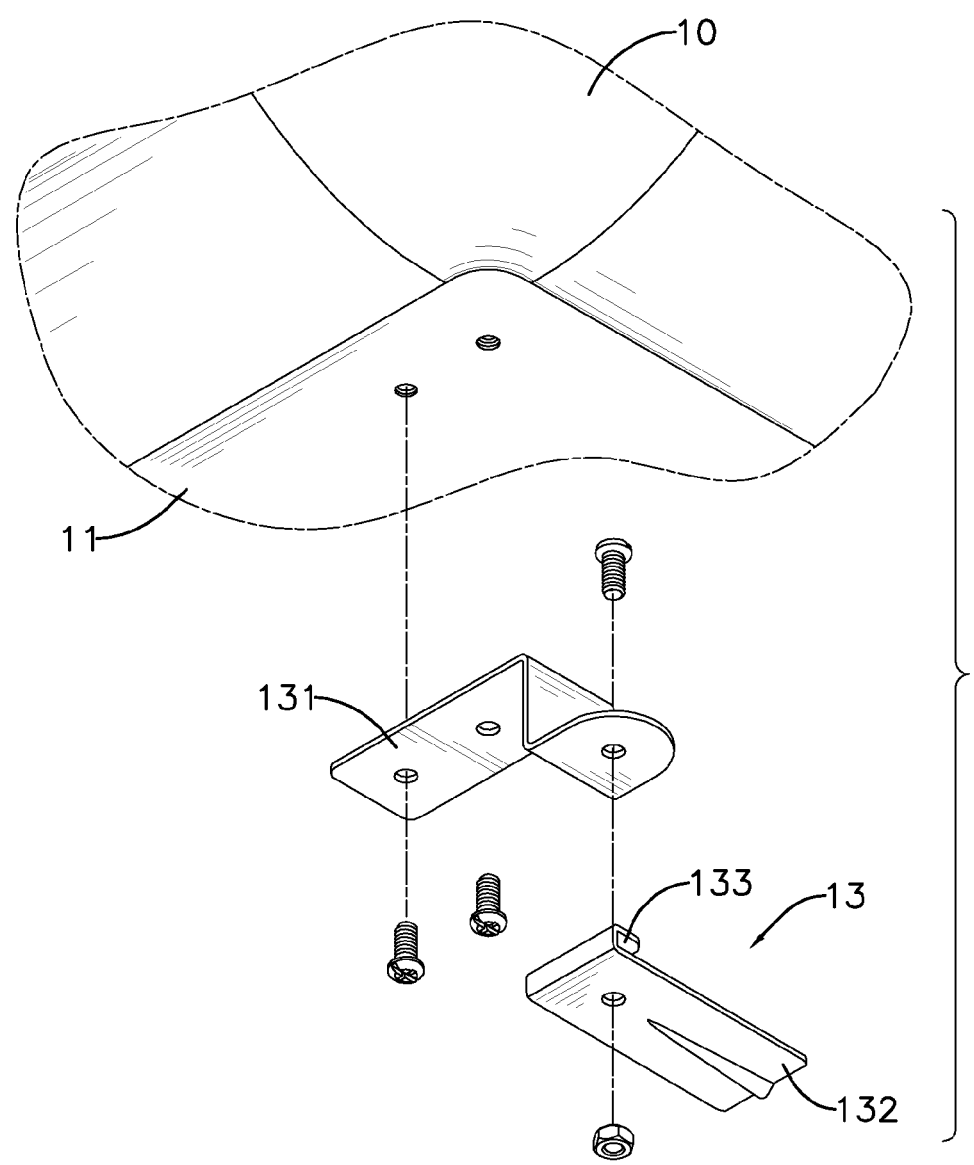
FIG. 3 is an enlarged exploded perspective view of the barbecue stove in FIG. 1.

With further reference to FIG. 3, the retainer 13 is mounted on the bottom 11 of the grill pan 10 and has a mounting bracket 131 and a holding bracket 132. The mounting bracket 131 is mounted securely on the bottom 11 of the grill pan 10 and has a mounting end. The holding bracket 132 is mounted rotatably on the mounting end of the mounting bracket 131 and has a hook 133 mounted around a peripheral edge of the mounting bracket 131 so a rotating range of the holding bracket 132 is limited.

The stand 20 is mounted on the bottom 11 of the grill pan 10 to support the grill pan 10 high above a plane, and has a main leg 21 and a secondary leg 22.

The main leg 21 is inverted U-shaped and has a pivot bar 211, two supporting bars 212, a reinforcing strut 213 and two wheels 214.

The pivot bar 211 of the main leg 21 is mounted through the gap of the grill pan 10 and is mounted pivotally on the bottom 11 of the grill pan 10 via two hinges 23. The supporting bars 212 of the main leg 21 protrude substantially perpendicular from the pivot bar 211 of the main leg 21. Each supporting bar 212 of the main leg 21 has a distal end.

The reinforcing strut 213 is mounted between and is attached to the supporting bars 212 of the main leg 21 adjacent to the distal ends of the supporting bars 212 of the main leg 21 to strengthen a structure of the main leg 21. The wheels 214 are respectively mounted rotatably on the distal ends of the supporting bars 212 of the main leg 21.

The secondary leg 22 is inverted U-shaped, is selectively held by the retainer 13, is selectively held by the holding bracket 132 of the retainer 13 and has a sliding bar 221 and two supporting bars 222.

The sliding bar 221 of the secondary leg 22 is mounted slidably through the gap of the grill pan 10. The supporting bars 222 of the secondary leg 22 protrude substantially perpendicular from the sliding bar 221 of the secondary leg 22 and are respectively connected pivotally to the supporting bars 212 of the main leg 21. Each supporting bar 222 of the secondary leg 22 has a distal end 223 curved outwardly and selectively abutting the distal end of a corresponding supporting bar 212 of the main leg 21.

Figure 4:
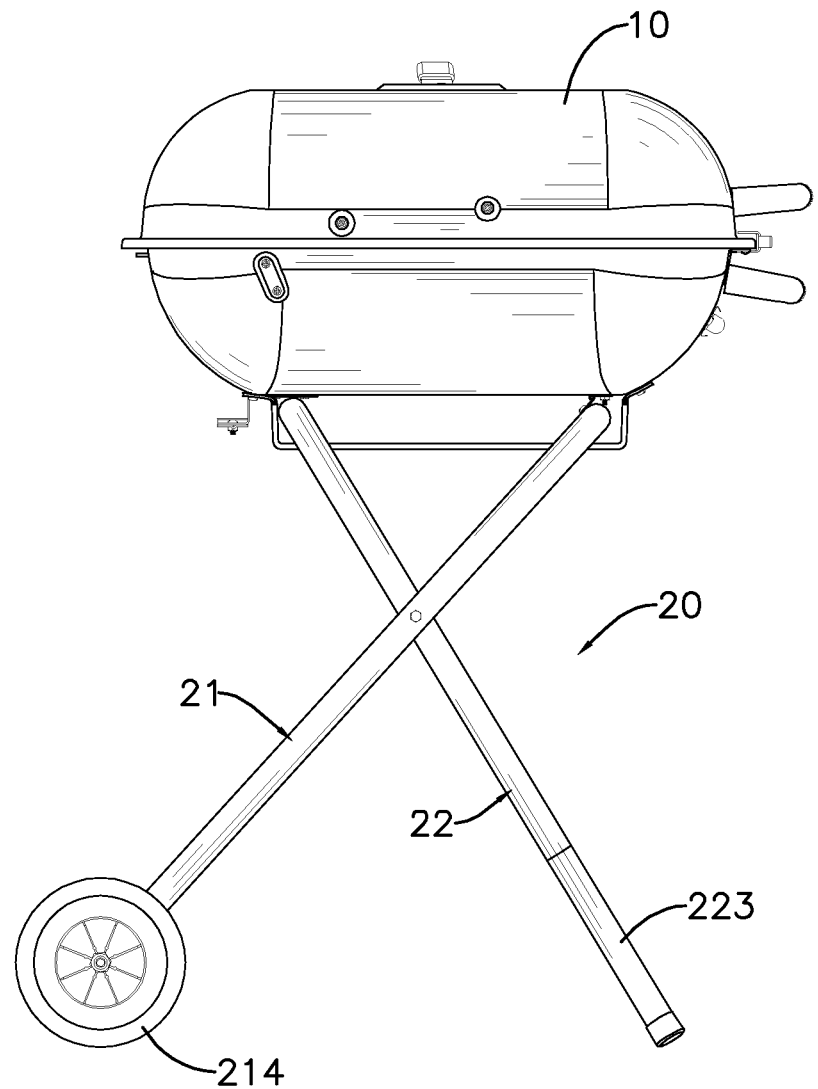
FIG. 4 is a side view of the barbecue stove in FIG. 1.

With further reference to FIG. 4, when the stand 20 is unfolded, the main leg 21 and the secondary leg 22 cross each other, and the sliding bar 221 of the secondary leg 22 abuts and is limited by the guiding frame 12. Thus, the stand 20 supports the grill pan 10 high above the plane.

Figure 5:
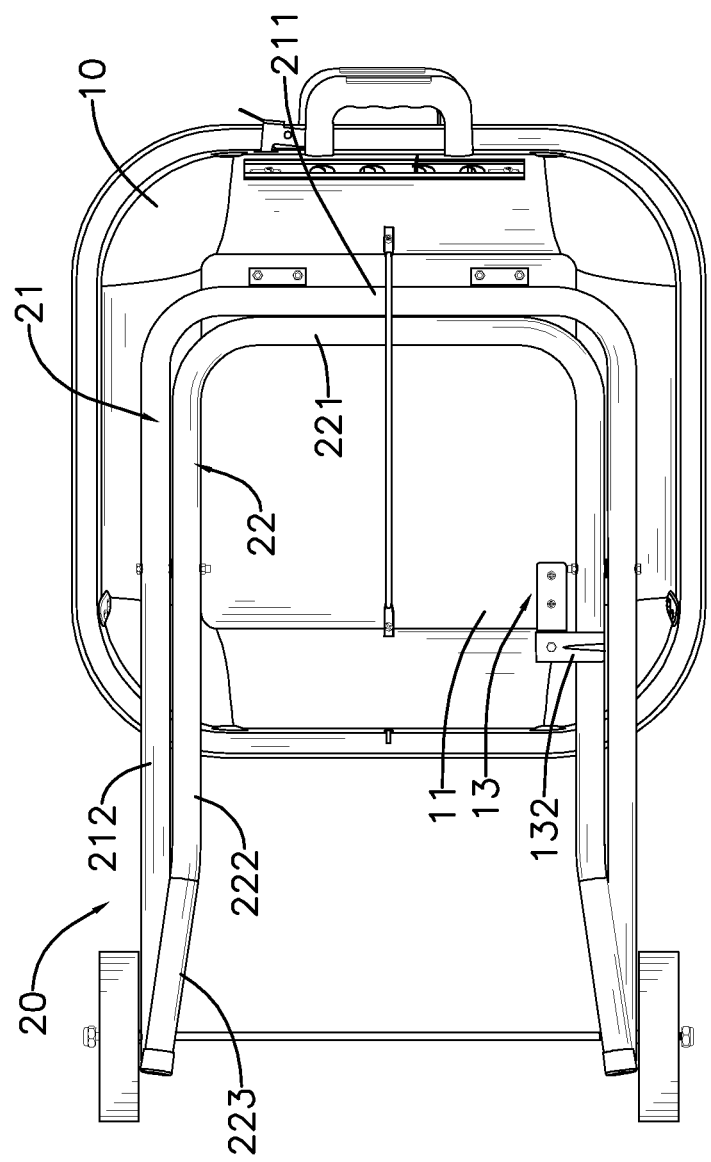
FIG. 5 is a bottom view of the barbecue stove in FIG. 1, shown collapsed.

With further reference to FIG. 5, when folding the stand 20, the sliding bar 221 of the secondary leg 22 slides toward the pivot bar 211 of the main leg 21. Then the main leg 21 and the secondary leg 22 overlap each other, and the main leg 21 is pivoted to allow the main and the secondary legs 21, 22 to lie on the bottom 11 of the grill pan 10. The curved distal ends 223 of the supporting bars 222 of the secondary leg 22 abut and hold the distal end of the supporting bar 212 of the main leg 21. Afterwards, the holding bracket 132 of the retainer 13 is turned to further hold the secondary leg 22. Thus, the stand 20 is folded stably on the bottom 11 of the grill pan 10.

The barbecue stove with the collapsible stand as described has the following advantages. The stand 20 of the barbecue stove has a simplified structure and therefore is easy to assemble, fold or unfold. Consequently, when the barbecue stove is folded, the barbecue stove has a compact size for ease of storage. Moreover, when the stand 20 is folded, a user is able to hold a handle of the grill pan 10 and draw the barbecue stove forward with the wheels 214 rolling on the plane. Thus, the barbecue stove is easily transported.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A barbecue stove with a collapsible stand comprising:
 a grill pan comprising:
  a bottom;
  a guiding frame mounted securely on said bottom of said grill pan;
  a gap formed between said bottom of said grill pan and said guiding frame; and
  a retainer mounted on said bottom of said grill pan and comprising:
   a mounting bracket mounted securely on said bottom of said grill pan and comprising a mounting end; and
   a holding bracket mounted rotatably on said mounting end of said mounting bracket and comprising a hook mounted around a peripheral edge of said mounting bracket; and
 a stand mounted on said bottom of said grill pan and comprising:
  a main leg comprising:
   a pivot bar mounted through said gap of said grill pan and mounted pivotally on said bottom of said grill pan; and
   two supporting bars protruding substantially perpendicular from said pivot bar of said main leg; and
  a secondary leg selectively held by said holding bracket of said retainer and comprising:
   a sliding bar mounted slidably through said gap of said grill pan; and
   two supporting bars protruding substantially perpendicular from said sliding bar of said secondary leg and respectively connected pivotally to the supporting bars of said main leg.

2. The barbecue stove as claimed in claim 1, wherein each supporting bar of said secondary leg comprises a distal end curved outwardly and selectively abutting a distal end of a corresponding supporting bar of said main leg.

3. The barbecue stove as claimed in claim 2, wherein said main leg of said stand further comprises two wheels respectively mounted rotatably on the distal ends of the supporting bars of said main leg.

4. The barbecue stove as claimed in claim 3, wherein said main leg of said stand further comprises a reinforcing strut mounted between and attached to said distal ends of the supporting bars of said main leg adjacent to said distal ends of the supporting bars of said main leg.

5. The barbecue stove as claimed in claim 4, wherein said guiding frame of said grill pan comprises:
 a crossbar separated from said bottom of said grill pan; and
 two mounting bars protruding substantially perpendicular from said crossbar of said guiding frame and attached securely to said bottom of said grill pan; and
 said gap of said guiding frame is defined between said bottom of said grill pan and said crossbar of said guiding frame.

6. The barbecue stove as claimed in claim 5, wherein said pivot bar of said main leg is mounted pivotally on said bottom of said grill pan via two hinges.

\* \* \* \* \*